(12) United States Patent
Benhaim et al.

(10) Patent No.: US 7,593,418 B1
(45) Date of Patent: Sep. 22, 2009

(54) APPARATUS AND A METHOD FOR ALLOCATING UPSTREAM BANDWIDTH OF A SHARED UPSTREAM CHANNEL OF AN OPTICAL NETWORK

(75) Inventors: Guy M. Benhaim, Ramat-Hasharon (IL); Erez Izenberg, Tel Aviv (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 742 days.

(21) Appl. No.: 10/808,024

(22) Filed: Mar. 23, 2004

(51) Int. Cl.
*H04J 3/26* (2006.01)
(52) U.S. Cl. ........................ 370/432; 370/471
(58) Field of Classification Search ................. 370/432, 370/431, 465, 443, 437, 439, 449, 470–473, 370/474, 395.4, 395.41, 395.43, 422, 451, 370/453, 455, 230
See application file for complete search history.

(56) References Cited

U.S. PATENT DOCUMENTS 5,978,374 A * 11/1999 Ghaibeh et al. ........ 370/395.43
6,546,014 B1 * 4/2003 Kramer et al. ......... 370/395.41
6,636,527 B1 * 10/2003 Lee et al. ..................... 370/465
7,031,343 B1 * 4/2006 Kuo et al. .................... 370/473

* cited by examiner

*Primary Examiner*—Chi H Pham
*Assistant Examiner*—Alexander Boakye

(57) ABSTRACT

The invention provides an apparatus and a method for allocating upstream bandwidth of a shared upstream channel of an optical network, the optical network interconnecting an apparatus with at least a first network unit and a second network unit, the method includes the stages of: (i) receiving requests for transmitting information towards the apparatus; and (ii) issuing data grants in response to at least the requests; wherein at least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate.

5 Claims, 6 Drawing Sheets

APPARATUS AND A METHOD FOR ALLOCATING UPSTREAM BANDWIDTH OF A SHARED UPSTREAM CHANNEL OF AN OPTICAL NETWORK

FIELD OF THE INVENTION

The present invention relates to communication systems and methods in general, and to methods and systems for media access control of a shared communication media. Even more particularly, to methods and systems for controlling upstream transmission of a point to multipoint optical network. The invention is applicable to, but not limited to, point to multipoint passive optical networks.

BACKGROUND OF THE INVENTION

Fixed Bit-Rate Optical Access Networks

Optical access networks, such as point to multipoint optical access networks are known in the art. ITU-T Recommendation G.983.1 defines an access network that utilizes optical fiber technology to: (i) convey point to multipoint downstream traffic from an apparatus such as an Optical Line Termination (OLT) to multiple network units such as Optical Network Units (ONUs) or Optical Network Terminations (ONTs) and (ii) to convey point to point upstream traffic from an ONU or ONT to the OLT. For convenience of explanation both ONT and ONU will be referred as ONU.

An OLT may transmit information destined to multiple ONUs (said transmission is referred broadcast or multicast) or to transmit information destined to a single OLT (said transmission referred to as narrowcast). When the OLT receives information destined to multiple ONUs it multiplexes said information and transmits the multiplexed information to the ONUs. Each ONU is capable of detecting the information that is destined to it and to further process it while ignoring information destined to other ONUs.

An ONU provides, either directly or remotely, the user-side interface of the Optical Access Network (OAN). An OLT is provides the network side interface of the OAN and is connected, either directly or via an ODN, to multiple ONUs.

In a typical optical access network, such as but not limited to Broadband Passive Optical Network (BPON), EPON, G.983 compliant networks and G.984 compliant networks, the OLT as well as the multiple ONT or ONUs share the same upstream bit-rate as well as the same downstream bit-rate. For example, a G.983 compliant network defines an upstream bit-rate of 155 Mpbs and a downstream bit-rate of 622 Mbps. One previous standard defines both upstream and downstream bit-rate of 155 Mpbs.

An OLT controls upstream transmission from the ONUs by determining which ONU shall transmit by applying time division multiplex access (TMDA) control schemes. It usually operates on a fixed duration time-slot basis, and determines which ONT shall transmit upstream information at each time-slot. The ONUs are notified in advance when they allowed to transmit upstream information by means of Grants that are transmitted by the OLT. The OLT may apply various MAC schemes which are known in the art and do not require further explanation.

As each PON is adapted to operate at a certain fixed bit-rate, the OLT assigns bandwidth to ONUs by determining the amount of time-slots to allocate for each of said ONUs.

According to the ITU-T Recommendation G.983.4 upstream bandwidth may assigned in two manners—(a) in response to the utilization of upstream bandwidth by each of the ONUs, and (b) in response to upstream status reports from the ONUs or ONTs. The status report are transmitted upstream in mini-slots assigned by the OLT.

A prior art OLT is capable of allocating time-slots in response to multiple quality of service (QoS) levels. Typically, each ONU has at least one Transmission Container (T-CONT), each T-CONT has at least one queue.

An ONU reports the queue length of T-CONTs that belong to him. A typical T-CONT has one or more queues that are associated with one or more classes of service. Accordingly, the aggregate queues length of that T-CONT is reported.

Upstream and Downstream Data Structures

A typical optical access network supports Asynchronous Transfer Mode (ATM) based data transmission. Each ATM cell is 53 bytes long and includes a 5-byte header and 48-byte payload. The ATM header is utilized for routing ATM cells across the ATM based network.

Upstream traffic is arranged in an upstream frame of 53 time-slots. Each time-slot consists of three-bytes of PON layer overhead and either an ATM cell or a PLOAM cell.

The OLT allocates upstream bandwidth on a time-slot basis in response to the T-CONTs queue length and then transmits downstream data grants in downstream PLOAM cells. Assuming that the upstream and downstream bit-rate are the same, then during a frame of 53 time-slots, two PLOAM cells are utilized for providing 53 data grants, corresponding to the 53 time-slots within each upstream frame. When the upstream data rate is much smaller than the downstream data rate, some PLOAM cells are empty.

In a typical PON downstream data is transmitted in serial data frames including multiple downstream slots, including framing slots and multiple ATM cell slots. Each downstream frame slot includes a field for transmitting upstream transmission permits. Upstream data is transmitted from an individual network unit in multiple upstream data slots, each upstream slot having a preamble portion and a payload portion.

Various schemes for upstream and down stream transmission over optical networks are illustrated at the following U.S. patent applications which are incorporated herein by reference: U.S patent application serial number 20030219031 titled "Time-slot management method, a related network terminator, a related line terminator and an upstream signal frame structure" of Gyselings, et al.; U.S. patent application serial number 20030016692, titled "Method and system for processing upstream packets of an optical network" of Thomas, et al.; U.S patent application serial number 20020030875 titled "method for requesting grant for MAC protocol in PON", of Kim et al.; and U.S patent application serial number 20030123483 titled "Method for dynamically allocating bandwidth in ATM passive optical network" of Kim et al.

Fixed Bit-Rate Receivers

The OLT has a downstream transmitter, for transmitting downstream information, and an upstream receiver, for receiving upstream information. Each ONU has an upstream transmitter, for transmitting upstream information, and a downstream receiver, for receiving downstream information. The exchange of information over the optical passive network takes into account the delays resulting from the distances between the OLT and each ONU. These delays are usually measured during an initialization stage that is also known as a ranging stage.

As mentioned above the upstream transmissions occur during time-slots. In many cases the downstream transmission forms a continuous time stream that eases the downstream synchronization process. The upstream receiver of the OLT is required to receive upstream information bursts from the multiple network units. Said reception usually includes various stages such as burst recognition, timing adjustments, clock and data recovery and the like.

Typically, the upstream receiver has an analog front end that is connected to a clock and data recovery (CDR) unit, a delimiter search unit, a byte align unit and a cell delineation unit. The upstream receiver may also include de-scrambling units, parsing units and the like.

The upstream receivers, and especially the CDR units and the cell delimitation units, are adapted to operate at a certain bit-rate, for example 622.08 Mpbs. Accordingly, an upstream receiver is designed to receive upstream information of a single bit-rate.

This single upstream bit-rate imposes various limitations upon the optical access network performance and may prevents network upgrades by adding high upstream rate ONUs and/or OLTs to the network. In order to overcome said bit-rate limitations ONUs having different upstream bit-rate can be added but this requires costly and complex adjustments such as allocating a new carrier wavelength for upstream transmission from said new ONU, adding additional connectivity between said ONU and the OLT, and the like.

There is a need to provide an apparatus and method for allowing upgrades of optical access networks as well as enhancing the flexibility of said access optical networks.

SUMMARY OF THE PRESENT INVENTION

The invention allows the transmission of upstream traffic at more than a single bit rate. The OLT is capable of receiving upstream transmission at multiple bit rates. The bit rates are known to the OLT that can allocate bandwidth in response to the upstream bit rate of each ONU. Once the bandwidth allocation is determined the OLT can adjust its receiver to receive upstream information of a certain bit rate from a certain ONU at a certain time-slot.

According to an embodiment of the invention ONUs of different bit rate can be added to an optical access network. The OLT shall be able to determine their bit-rate or to receive information reflecting said bit rate) and receive their transmissions as well as take into account their bit-rate when issuing grants.

The invention provides a computer readable medium having code embodied therein for causing an electronic device to perform the stages of: (i) receiving requests for transmitting information from a network unit, over an optical network, towards an apparatus; and (ii) issuing data grants in response to the requests and optionally also in response to additional parameters. At least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate.

The invention provides a method for allocating upstream bandwidth of a shared upstream channel of an optical network, the optical network interconnecting an apparatus with at least a first network unit and a second network unit, the method includes the stages of: (i) receiving requests for transmitting information towards the apparatus; and (ii) issuing data grants in response to the requests and even in response to additional parameters such as quality of service levels associated with the request, network and policy rules and the like. At least one issued grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate.

The invention provides an apparatus that includes: (i) a transmitter for transmitting information towards at least a first network unit and a second network unit; (ii) a receiver for receiving information transmitted from at least the first or the second network unit; and (iii) a media access controller for issuing data grants. At least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate. Conveniently, the data grant authorizes a network unit to transmit at least one cell during at least one time-slot. Preferably, the cells are ATM cells.

According to an embodiment of the invention the receiver has at least one reception path adapted to receive information bursts of at least one bit-rate.

According to an embodiment of the invention the apparatus is further adapted to receive information reflecting at least one bit-rate out of the first bit-rate and the second bit-rate.

According to an embodiment of the invention the media access controller is operable to request a network unit capable of transmitting at multiple bit-rates to transmit at certain bit-rate out of said multiple bit-rates.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
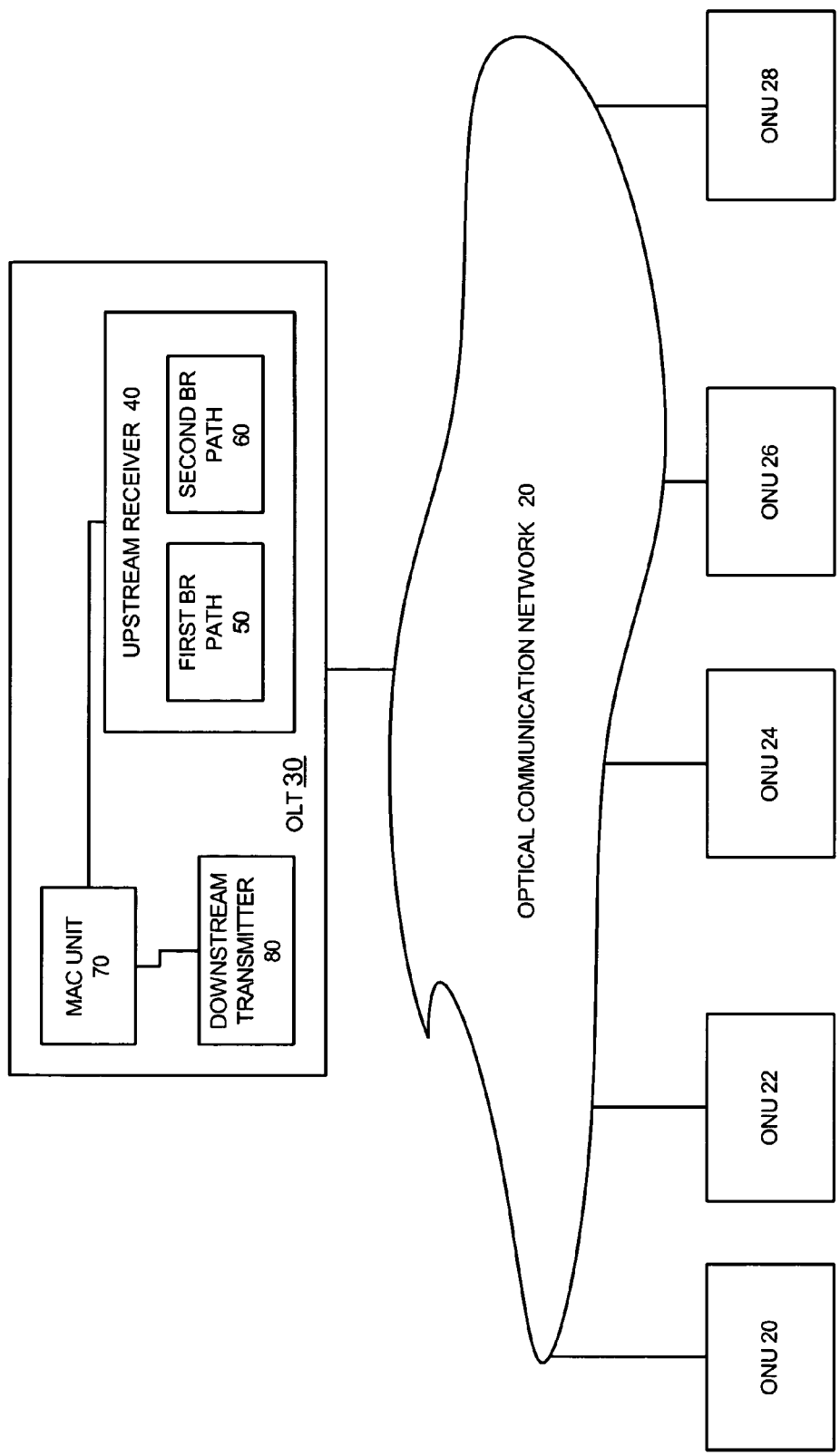
FIG. 1 is a schematic illustration of an optical communication network interconnecting an apparatus and multiple network units, in accordance with an embodiment of the invention.

Reference is made to FIG. 1, which is a schematic illustration of an optical communication network 20 interconnecting an apparatus, such as OLT 30 and a plurality of network units such as ONUs 20-28. It is noted that network 20 may include additional components, and may interconnect additional components to each other.

For convenience of explanation it is assumed that: (i) ONUs 20, 22 and 24 are adapted to transmit at a first bit-rate such as but not limited to 155 Mpbs, (ii) ONU 26 is adapted to transmit at a second bit-rate such as but not limited to 622 Mpbs, (iii) and that ONU 28 can transmit at both first and second bit-rates.

It should be noted that the mentioned above assumptions are for ease of explanation and do not intend to limit the scope of the invention. For example the bit rates may differ from 155 and 622 Mbps, the ratio between said bit rates may differ, and the system may manage more than two available bit rates.

Furthermore, the OLT 30 is capable of managing a transmission of various data structures (such as IP packets, Ethernet packets and other structures that differ from ATM cells).

The term "bit rate" refers to the rate of signals propagating over the channels between the ONU and OLT. This may be also referred to as a channel bit rate, or a line bit rate or even a physical layer bit rate.

The OLT 30 has an upstream receiver 40 that includes: (i) a first bit-rate path 50 for receiving upstream information having a first bit-rate, and (ii) a second bit-rate path 60 for receiving upstream information having a second bit-rate. According to aspects of the invention both paths may be combined to provide a multiple bit-rate path.

OLT 30 also has a media access control (MAC) unit 70 that determines when each ONT will transmit information. This determination process is further explained in some of the following paragraphs. The MAC unit 70 provides grants to a downstream transmitter 80 that transmits information destined to the ONUs as well as these grants and additional miscellaneous information.

According to an aspect of the invention, the allocation is made on a time-slot basis. During said time-slot the amount of transmitted upstream information depends upon the bit-rate of the upstream transmission. Referring to FIG. 1, ONU 20 can transmit a certain amount (N) of information during a certain time-slot while ONU 26 can transmit R*N cells, during another time-slot of the same length, whereas R is the ratio between the bit rates Typically, an ONU includes a downstream receiver that is operable to: (i) Receive downstream traffic being transmitted over a passive optical network. The downstream traffic includes data destined to at least one of the ONUs, grants and may also include miscellaneous information, (ii) extract the downstream information destined to itself and provide it to devices/interfaces (not shown) that are positioned in a downstream path, and (iii) extract data grants destined to itself.

The extracted grants are provided to upstream assembler and transmitter that in response triggers a provision of a group of ATM cells from a queue within the ONU to the passive optical network, at a certain timing that reflects the grant as well as the delay between the ONU and the OLT.

Figure 2:
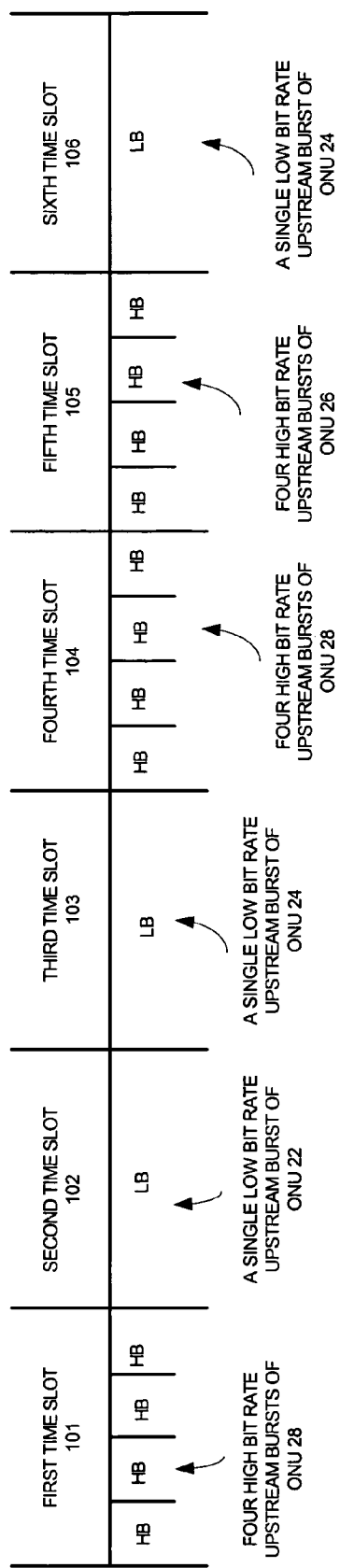
FIG. 2 is a timing diagram that illustrates the difference between the high bit-rate and low bit-rate upstream transmission, in accordance with an embodiment of the invention.

FIG. 2 is a timing diagram 100 that illustrates the difference between high bit-rate upstream transmission and low bit-rate upstream transmission. The timing diagram 100 shows six consecutive fixed size time-slots 101-106 that are allocated for upstream transmission. These six timeslots can be, for example, a part of a single MAC cycle of fifty-three slots.

During each of first time-slot 101 and fourth time-slot 104 ONU 28 is allowed to transmit four upstream bursts (denoted HB), at a bit-rate of 622 Mpbs. During a second time-slot 102 ONU 22 is allowed to transmit a single upstream burst (denoted LB), at a bit-rate of 155 Mpbs. During a third time-slot 103 and a sixth time-slot 106 ONU 24 is allowed to transmit a single burst (LB) at a bit-rate of 155 Mps. During a fifth time-slot ONU 26 is allowed to upstream transmit four information bursts (denoted HB) at a bit-rate of 622 Mpbs. It is noted that the fixed time-slots may be selected such as to allow the upstream transmission of more than a single burst of low bit-rate, but this is not necessarily so.

The OLT 20 has to know the transmission bit-rate of each ONU. This information may be fed to the OLT by a network operator, either directly (by specifying the bit-rate) or indirectly (by providing an indication such as a serial number of the ONU, that may be processed to determine the bit-rate). The information may also be upstream transmitted by the ONU.

According to another alternative the OLT itself may determine the bit-rate of each ONU by processing upstream transmission from these ONUs. For example, OLT 20 may process an upstream transmission from a certain ONU by the first bit-rate path 50 as well as the second bit-rate path 60 and determine the bit-rate of the ONU. Once the OLT determines that certain bit-rate it may request the ONU to perform a transmission at another bit-rate and if the ONU is capable of such a transmission the OLT may process that other bit-rate to determine said other bit-rate.

If an ONU is capable of transmitting at more than a single bit-rate it is usually configured to utilize the higher bit-rate, but this is not necessarily so. For example, an ONU may be configures to transmit at a low bit rate that can be increased only if the OLT approves the ONU to increase the bit rate. In either case the OLT must know in what bit-rate that ONU operates, thus allowing proper reception of upstream transmission as well as more accurate bit-rate allocation. The bit-rate may be determined in one of the mentioned above manners. It is noted that in various systems the status of ONU are checked periodically. Said status may include the upstream bit-rate.

According to an embodiment of the invention the OLT may request such a multiple bit rate ONU to transmit at a certain bit rate, in response to various parameters.

Figure 3:
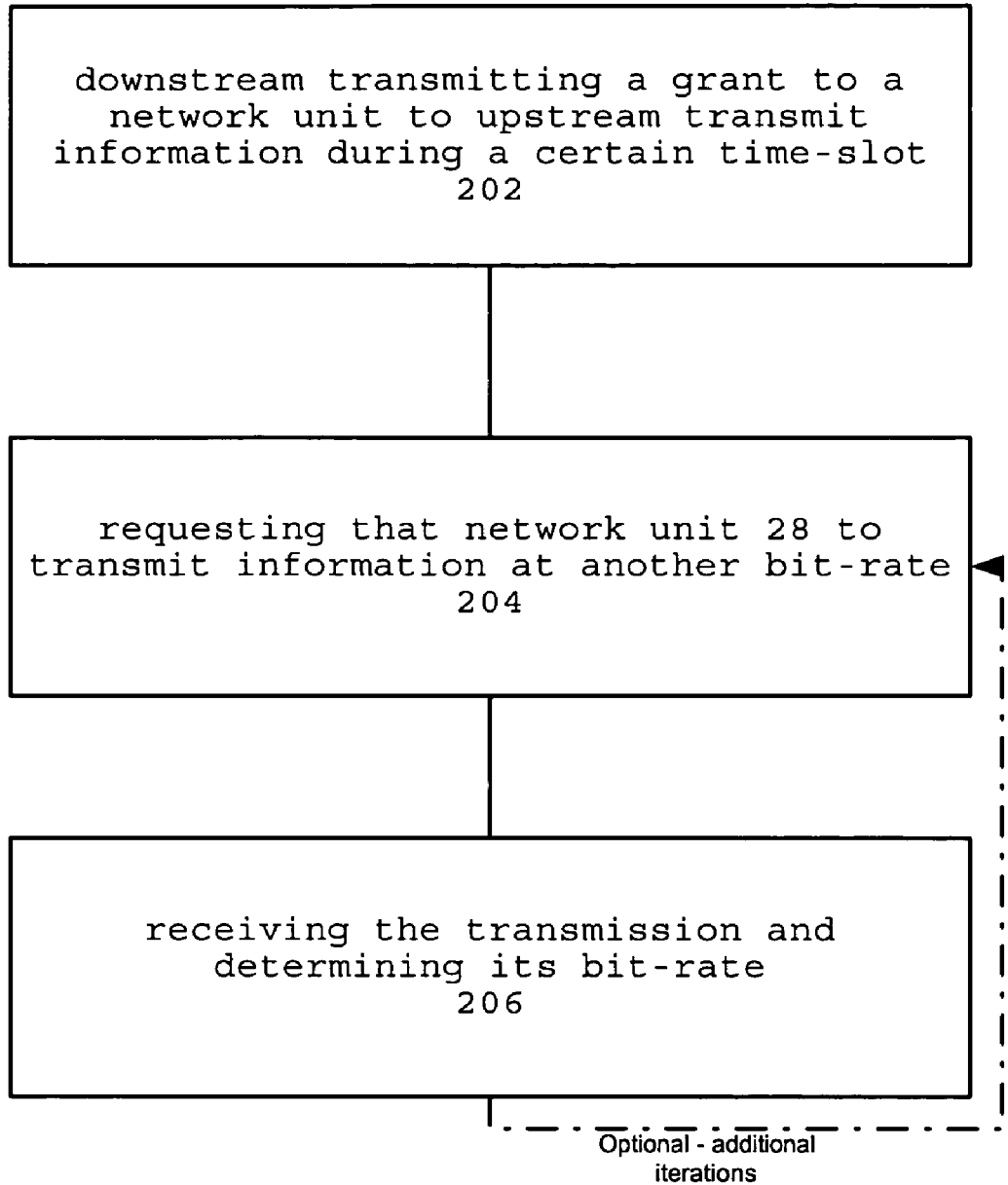
FIG. 3 is a flow chart illustrating a sequence of stages during which an apparatus of FIG. 1 determines the transmission bit-rate of a network unit, in accordance with an embodiment of the invention.

FIG. 3 illustrate a sequence 200 of stages during which ONT 20 determines the upstream transmission bit-rate of ONU 28. Sequence 200 starts by stage 202 of downstream transmitting a grant to ONU 28 to upstream transmit information during a certain time-slot. In some cases this is done during a ranging stage but this is not necessarily so. Stage 200 is followed by stage 202 of receiving, during said time-slot an upstream transmission from ONU 28 and determining its bit-rate. Stage 202 may include providing the received signals to the first bit-rate path 50 as well as the to second bit-rate path 60 and determine the bit-rate. Said determination may be based upon a detection of a predefined signal sequence at one of said paths. During stage 202 ONU 28 may transmit at a bit-rate that will be further used by the ONU 28 but this is not necessarily so.

Stage 202 is followed by stage 204 of requesting the ONU 28 to transmit information at another bit-rate.

Stage 204 may be followed by stage 206 of receiving the transmission and determining its bit-rate. It is noted that ONUs that are adapted to transmit at a single bit-rate may ignore the request of stage 204.

It is also noted that sequence 200 may include additional steps, if an ONU is capable of upstream transmission at more than two possible bit-rates.

Information relating to upstream bit-rates may be inserted in various information fields that are allocated for miscellaneous purposes. These fields may be included within PLOAMS, but this is not necessarily so.

Figure 4:
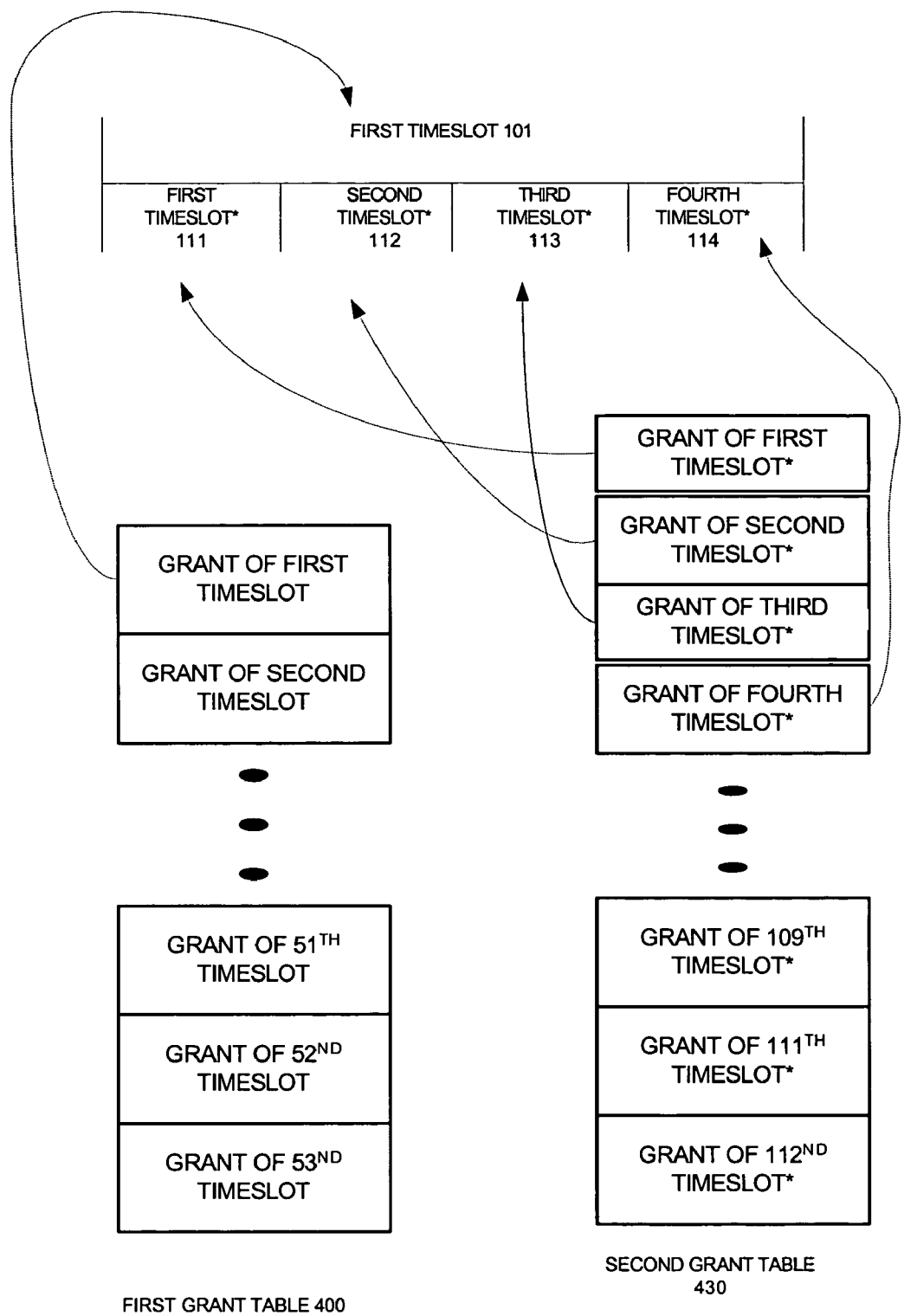
FIG. 4 illustrates a first grant table and a second grant tables, in accordance with an embodiment of the invention.

According to an aspect of the invention, the lower bit-rate network units, such as ONU 22 access a first portion of the downstream transmitted information to retrieve grants, while the higher bit-rate network units access a second portion. Referring to FIG. 4 and to the network units of FIG. 1, a first grant table 400 is accessed by lower bit-rate network units, such as ONU 22 while a second grant table 430 is accessed by higher bit-rate network units, such as ONU 26.

Assuming that each MAC cycle determines the upstream transmission during fifty three time-slots, then the first grant table 400 has fifty three entries, each referring to a single time-slot, while the second grant table 430 has two hundred and twelve entries (53×4=112), as during each time-slots four high bit-rate upstream bursts can be transmitted. The fraction of the time slot during which a single high bit burst can be transmitted is illustrated as TIMESLOT*. The entries of the first grant table 400 may include grants for the low bit-rate network units and idle content when a high bit-rate network unit shall transmit. The grants for high bit-rate transmission can be included within the second grant table 430. These tables or other formation of data representative of grants may be includes within PLOAMS or additional slots.

According to an aspect of the invention the first fifty-three entries of the second grant table 430 are idle, and the remaining entries may include grants, while the first grant table 400 includes grants for low bit-rate network units.

According to yet another embodiment of the invention the grants are provided on a low bit rate basis (for example one grant per time-slot) and the high bit-rate network units are able to interpret a single grant as a permission to transmit multiple bursts during said time-slot.

Figure 5:
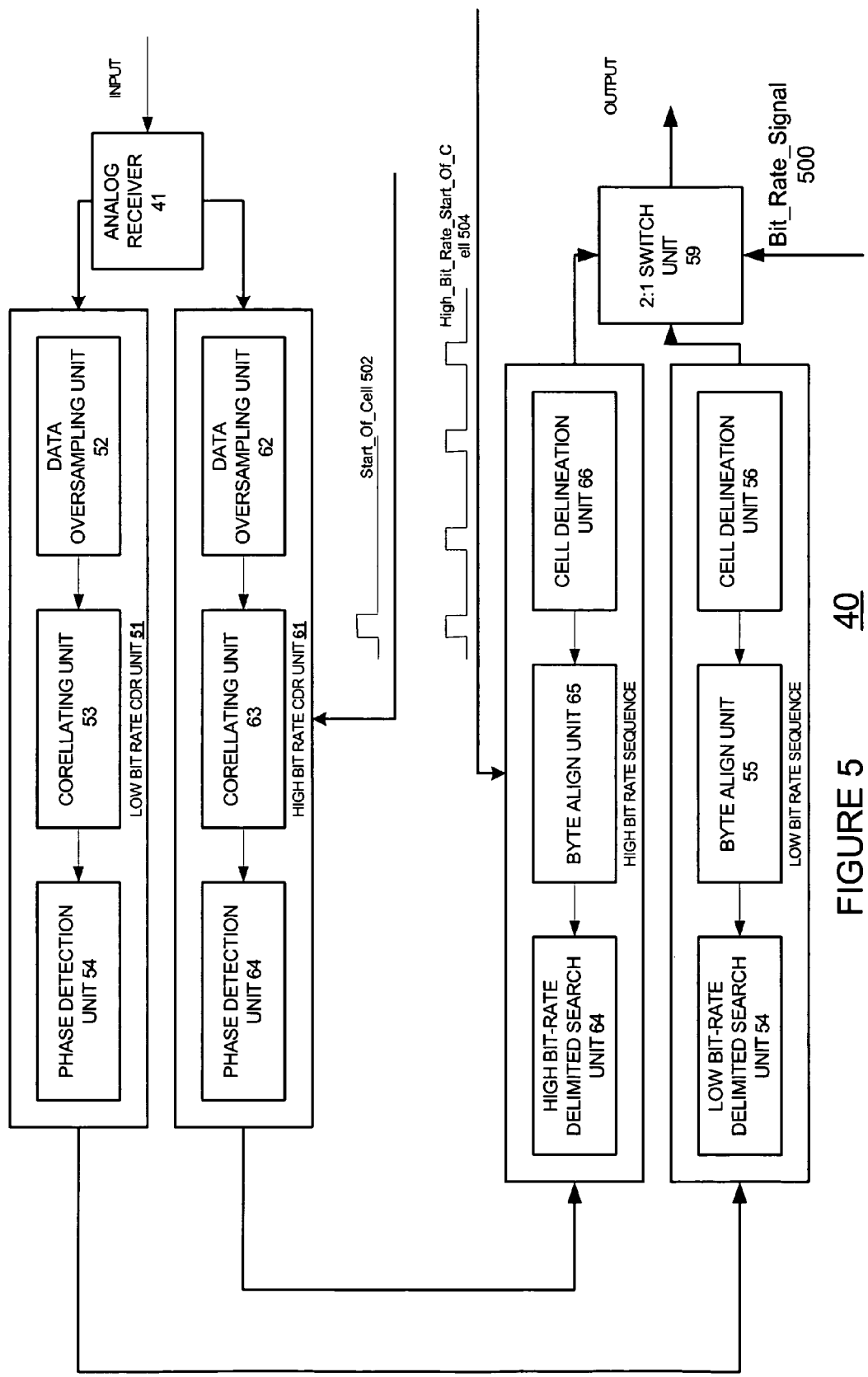
FIG. 5 illustrates in greater detail an upstream receiver of the apparatus of FIG. 1, in accordance with an embodiment of the invention.

FIG. 5 illustrates in greater detail the upstream receiver 40 of OLT 30. The upstream receiver 40 is capable of receiving upstream bursts at various bit-rates. The receiver 40 may operate in two operational modes. When operating at the first operational mode the upstream receiver 40 is not aware of the upstream bit-rate and usually activates multiple bit-rate paths, such as paths 50 and 60, in order to determine the bit-rate. This first operational mode usually occurs during an initialization stage such as a ranging stage. During the second operations mode, which is usually the "steady state" mode, the receiver knows the bit-rate of a received burst and accordingly activates only the appropriate path. Typically the MAC unit 70 informs the upstream receiver 40 about the bit-rate of expected bursts in advance such as to allow the upstream receiver 40 to operate in an optimal manner. There are various manners to inform the upstream receiver. For example in FIG. 5 said information is conveyed by a Bit-rate signal 500, but this is not necessarily so.

Upstream receiver 40 includes an analog receiver 41 that receives analog optical signals and converts them to digital signals. The analog receiver 41 provides these digital signals to a low bit-rate CDR unit 51 as well to a high bit-rate CDR unit 61. Various CDR unit configurations are known in the art and require not further explanation. Nevertheless, for convenience of explanation FIG. 5 illustrates a non limiting configuration of certain CDR units. Each of said CDR units includes a data over-sampling unit (52 and 62 respectfully), a correlating unit (53 and 63 accordingly) and a phase detection unit (54 and 64 accordingly). Each CDR unit (51, 61) is operable to send the received signals through multiple parallel delay lines of different delays, sample the incoming information as well as each of the delayed signals at a higher rate (a least twice than the incoming bit-rate), and process said samples to determine the exact timing of the incoming signal. Once the timing is determined the data signals, as well as clock signals, that are aligned to the timing of the incoming signals are generated. It is noted that many CDR units are known, and the upstream receiver 40 may include any of these types.

The CDR units (51, 61) are triggered by a start_of_cell pulse 502 that indicates that a cell is scheduled to be received by the receiver 40. Start_of_cell signal 502 is usually asserted whenever a time-slot begins. It is noted that CDR unit 51 as well as CDR unit 61 outputs both clock and data signals, but for simplicity of information only the data path is illustrated.

The low bit-rate CDR unit 51 is followed by a low bit-rate delimiter search unit 54, a byte align unit 55 and a cell delineation unit 56. The high bit-rate CDR unit 61 is followed by a low bit-rate delimiter search unit 64, a byte align unit 65 and a cell delineation unit 66. While the sequence of low bit-rate units 54-56 are triggered by a start_of_cell pulse 502, the sequence of high bit-rate units 64-66 is fed by a train of multiple high_bit_rate_start_of_cell pulses 504 that represents a reception of multiple bursts during a single time-slot. The outputs of both cell delineation units 56 and 66 are fed to a 2:1 switch/de-multiplexing unit that selects the appropriate output in response to a Bit_rate signal 500.

The delimiter search unit searches for a predefined sequence of incoming signals that represent a start of information. The byte align unit arranges the incoming information in a byte aligned manner.

According to another embodiment of the invention a 2:1 switch is positioned between the CDR units 51 and 61 and between sequences 54-56 and 64-66.

According to various embodiments of the invention the upstream receiver 40 has a single multiple bit-rate path instead of multiple separate paths. The path can be configured to receive information of a first bit-rate at a certain time and to receive information of a second bit rate at another time. The receiver can also include a multi-cycle logic in which a high frequency clock signals is selectively used to provide clock signals of varying frequencies.

Figure 6:
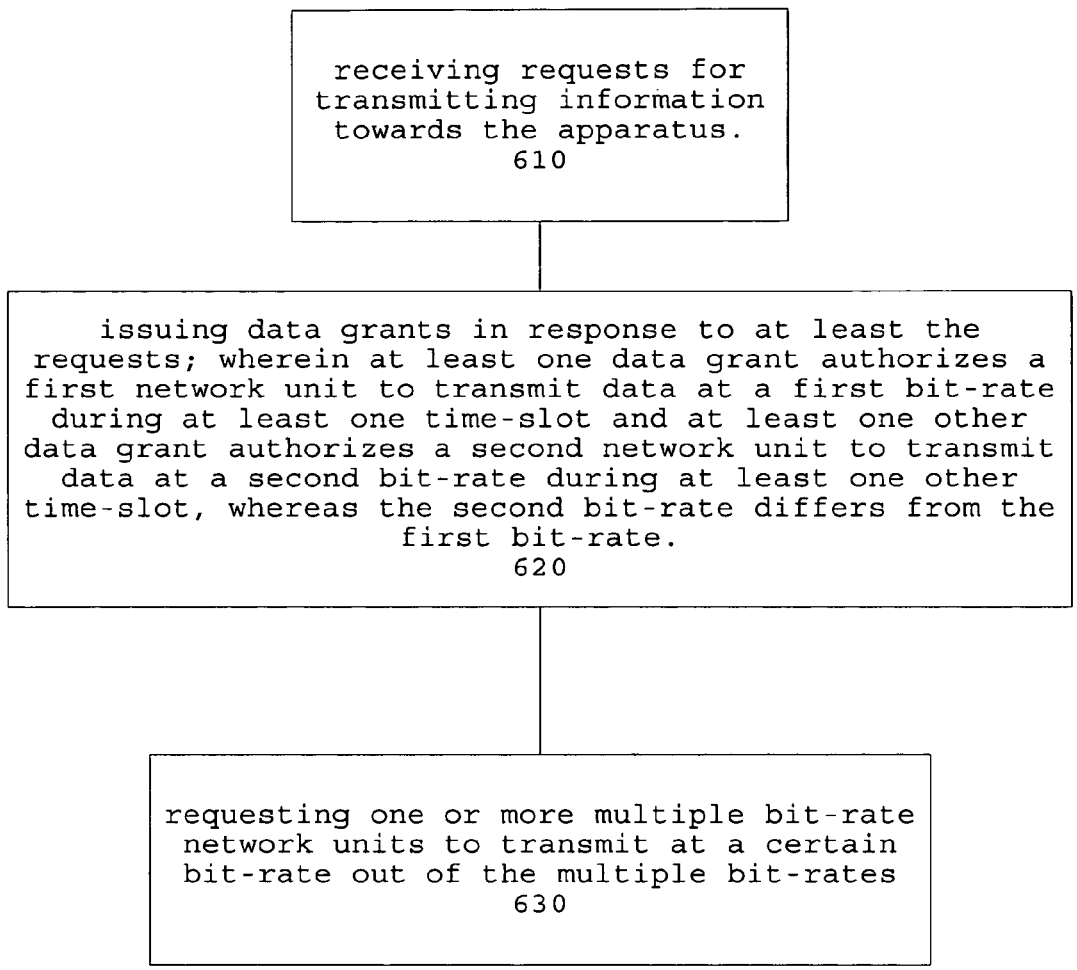
FIG. 6 is a schematic illustration of a method for media access control, according to an embodiment of the invention.

FIG. 6 is a schematic illustration of a method 600 for media access control, according to an embodiment of the invention.

Method 600 starts at stage 610 of receiving requests for transmitting information towards the apparatus. Referring to the example of FIG. 1, ONUs 20-28 request to transmit information towards OLT 30.

Stage 610 is followed by stage 620 of issuing data grants in response to at least the requests; wherein at least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate. Referring to the example of FIGS. 1 and 2, when OLT 30 issues a single grant to either one of ONUs 20, 22 and 24, it will accept to receive a single low bit-rate burst (LB) during a single time-slot (such as time-slots 102, 103 and 106). When OLT 30 issues a single grant to either one of ONUs 26 and 28 (when operating at a high-bit rate mode), it will accept to receive four high bit-rate bursts (HB) during a single time-slot (such as time-slots 101, 104 and 105).

Method 600 may include a preliminary stage or sequence of stages (such as the sequence 200 of FIG. 3) of determining the bit-rate of each network unit, whereas these bit-rates affect the bandwidth allocation.

Method 600 may further include an optional stage 630 of requesting one or more multiple bit-rate network units to transmit at a certain bit-rate out of the multiple bit-rates. The request may be responsive to various parameters, such as but not limited to at least one of the following: (i) network unit related information previously transmitted from the network unit, this information may indicate the available bit-rates, the priority of the network unit of any queue within said network unit; (ii) bit-rates of other network units that are connected to the apparatus; or (iii) requests for transmitting information. The multiple bit-rate network unit may accept or reject the request and shall notify the OLT about the bit rate of future upstream transmissions. The OLT can also determine the bit rate, as mentioned above.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

We claim:

1. An apparatus comprising:
    a transmitter for transmitting information towards at least a first network unit and a second network unit;
    a receiver for receiving information transmitted from at least one network unit; and
    a media access controller for issuing data grants; wherein at least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate; wherein a ratio between the second bit-rate and the first bit-rate ranges between two and six.

2. A method for allocating upstream bandwidth of a shared upstream channel of an optical network, the optical network interconnecting an apparatus with at least a first network unit and a second network unit, the method comprising the stages of:
    receiving requests for transmitting information towards the apparatus; and issuing data grants in response to the requests; wherein at least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate;
    wherein a data grant authorizes a network unit to transmit at least one cell during at least one time-slot; and
    wherein a ratio between the second bit-rate and the first bit-rate ranges between two and six.

3. A method for allocating upstream bandwidth of a shared upstream channel of an optical network, the optical network interconnecting an apparatus with at least a first network unit and a second network unit, the method comprising the stages of:
    receiving requests for transmitting information towards the apparatus;
    issuing data grants in response to the requests; wherein at least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate; and
    requesting a network unit capable of transmitting at multiple bit-rates to transmit at certain bit-rate out of said multiple bit-rates;
    wherein the stage of requesting is preceded by a stage of selecting said certain bit-rate in response to network unit related information previously transmitted from the network unit.

4. A method for allocating upstream bandwidth of a shared upstream channel of an optical network, the optical network interconnecting an apparatus with at least a first network unit and a second network unit, the method comprising the stages of:
    receiving requests for transmitting information towards the apparatus;
    issuing data grants in response to the requests; wherein at least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate; and
    requesting a network unit capable of transmitting at multiple bit-rates to transmit at certain bit-rate out of said multiple bit-rates;
    wherein the stage of requesting is preceded by a stage of selecting said certain bit-rate in response to bit-rates of other network units that are coupled to the apparatus.

5. A method for allocating upstream bandwidth of a shared upstream channel of an optical network, the optical network interconnecting an apparatus with at least a first network unit and a second network unit, the method comprising the stages of:
    receiving requests for transmitting information towards the apparatus;
    issuing data grants in response to the requests; wherein at least one data grant authorizes a first network unit to transmit data at a first bit-rate during at least one time-slot and at least one other data grant authorizes a second network unit to transmit data at a second bit-rate during at least one other time-slot, whereas the second bit-rate differs from the first bit-rate; and
    requesting a network unit capable of transmitting at multiple bit-rates to transmit at certain bit-rate out of said multiple bit-rates;
    wherein the stage of requesting is preceded by a stage of selecting said certain bit-rate in response to the requests for transmitting information.

* * * * *

UNITED STATES PATENT AND TRADEMARK OFFICE
CERTIFICATE OF CORRECTION

PATENT NO. : 7,593,418 B1  Page 1 of 1
APPLICATION NO. : 10/808024
DATED : September 22, 2009
INVENTOR(S) : Benhaim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1411 days.

Signed and Sealed this

Fourteenth Day of December, 2010

David J. Kappos
*Director of the United States Patent and Trademark Office*